US010596769B2

(12) United States Patent
Pham et al.

(10) Patent No.: US 10,596,769 B2
(45) Date of Patent: Mar. 24, 2020

(54) BAGGING PROCESS AND MANDREL FOR FABRICATION OF ELONGATED COMPOSITE STRUCTURE

(71) Applicant: The Boeing Company, Chicago, IL (US)

(72) Inventors: Doan D. Pham, Tacoma, WA (US); Mark W. Tollan, Puvallup, WA (US); John D. Morris, Seattle, WA (US)

(73) Assignee: The Boeing Company, Chicago, IL (US)

( * ) Notice: Subject to any disclaimer, the term of this patent is extended or adjusted under 35 U.S.C. 154(b) by 273 days.

(21) Appl. No.: 15/043,618

(22) Filed: Feb. 14, 2016

(65) Prior Publication Data

US 2016/0167315 A1 Jun. 16, 2016

Related U.S. Application Data

(62) Division of application No. 12/332,190, filed on Dec. 10, 2008, now Pat. No. 9,296,187.

(51) Int. Cl.
| | |
|---|---|
| *B29C 70/30* | (2006.01) |
| *B32B 37/10* | (2006.01) |
| *B29C 70/44* | (2006.01) |
| *B29C 33/48* | (2006.01) |
| *B29C 33/50* | (2006.01) |
| *B29K 105/00* | (2006.01) |
| *B29L 31/30* | (2006.01) |

(52) U.S. Cl.
CPC ............ *B29C 70/30* (2013.01); *B29C 33/485* (2013.01); *B29C 33/505* (2013.01); *B29C 70/446* (2013.01); *B32B 37/10* (2013.01); *B32B 37/1009* (2013.01); *B29K 2105/253* (2013.01); *B29L 2031/3076* (2013.01)

(58) Field of Classification Search
CPC ............... B29C 63/20; B29C 66/0224; B29C 66/02245; B32B 37/10; B32B 37/1009
See application file for complete search history.

(56) References Cited

U.S. PATENT DOCUMENTS

| | | | |
|---|---|---|---|
| 994,643 | A | 6/1911 | Johnson |
| 2,170,188 | A | 8/1939 | Cobi |
| 3,072,995 | A | 1/1963 | Buxton |
| 3,266,767 | A | 8/1966 | Long |
| 3,279,740 | A | 10/1966 | Long |
| 3,656,255 | A | 4/1972 | Rosenfeld |
| 3,720,389 | A | 3/1973 | Ferris |
| 3,768,769 | A | 10/1973 | Sachs |

(Continued)

FOREIGN PATENT DOCUMENTS

| | | |
|---|---|---|
| DE | 3911312 C1 | 4/1990 |
| EP | 2402134 A2 | 1/2012 |

(Continued)

OTHER PUBLICATIONS

Office Action, dated Jun. 16, 2011, regarding U.S. Appl. No. 12/332,093, 8 pages.

(Continued)

*Primary Examiner* — Christopher T Schatz
(74) *Attorney, Agent, or Firm* — Yee & Associates, P.C.

(57) ABSTRACT

A mandrel for composite fabrication includes an open cell foam carrier and at least one vacuum bag enclosing the open cell foam carrier.

18 Claims, 6 Drawing Sheets

(56) References Cited

U.S. PATENT DOCUMENTS

| | | | |
|---|---|---|---|
| 3,862,736 | A | 1/1975 | Herro |
| 4,119,695 | A | 10/1978 | Asserback |
| 4,310,138 | A | 1/1982 | Johnston |
| 4,548,859 | A * | 10/1985 | Kline ............... B29C 37/006 427/243 |
| 4,662,587 | A | 5/1987 | Whitener |
| 4,780,262 | A | 10/1988 | Vonvolkli |
| 5,013,514 | A | 5/1991 | Azzani et al. |
| 5,106,568 | A | 4/1992 | Honka |
| 5,139,409 | A | 8/1992 | Bevan et al. |
| 5,259,901 | A | 11/1993 | Davis et al. |
| 5,266,137 | A | 11/1993 | Hollingsworth |
| 5,368,807 | A | 11/1994 | Lindsay |
| 5,382,150 | A | 1/1995 | Henrio |
| 5,387,098 | A | 2/1995 | Willden |
| 5,425,628 | A | 6/1995 | Pinckney et al. |
| 5,464,337 | A * | 11/1995 | Bernardon ............ B29C 33/302 264/257 |
| 5,507,341 | A | 4/1996 | Eslinger et al. |
| 5,538,589 | A | 7/1996 | Jensen et al. |
| 5,605,195 | A | 2/1997 | Eslinger et al. |
| 5,645,668 | A | 7/1997 | Lin et al. |
| 5,707,576 | A | 1/1998 | Asher |
| 5,851,619 | A | 12/1998 | Sakai et al. |
| 6,403,179 | B1 | 6/2002 | Adachi |
| 6,692,681 | B1 | 2/2004 | Lunde |
| 6,808,154 | B2 | 10/2004 | Koren |
| 6,820,654 | B2 | 11/2004 | Lindsay |
| 7,083,698 | B2 | 8/2006 | Engwall et al. |
| 7,216,832 | B2 | 5/2007 | Simpson et al. |
| 7,293,737 | B2 | 11/2007 | Engwall et al. |
| 7,357,166 | B2 | 4/2008 | Pham et al. |
| 7,972,466 | B2 | 7/2011 | Martinez Cerezo et al. |
| 8,293,051 | B2 | 10/2012 | Morris et al. |
| 8,430,984 | B2 | 4/2013 | Lee et al. |
| 2005/0211843 | A1 | 9/2005 | Simpson et al. |
| 2005/0258575 | A1 | 11/2005 | Kruse et al. |
| 2007/0096368 | A1 * | 5/2007 | Hanson ............... B29C 33/505 264/314 |
| 2007/0107832 | A1 | 5/2007 | Frantz et al. |
| 2007/0221820 | A1 | 9/2007 | Wyett |
| 2008/0029644 | A1 | 2/2008 | Martinez Cerezo et al. |
| 2009/0166921 | A1 | 7/2009 | Jacob et al. |
| 2010/0139850 | A1 | 6/2010 | Morris et al. |
| 2010/0139857 | A1 | 6/2010 | Pham et al. |
| 2010/0222165 | A1 | 9/2010 | Nurnberg et al. |
| 2011/0027405 | A1 | 2/2011 | Hanson et al. |
| 2013/0022702 | A1 | 1/2013 | Morris et al. |
| 2014/0322382 | A1 | 10/2014 | Morris et al. |

FOREIGN PATENT DOCUMENTS

| | | |
|---|---|---|
| FR | 2607852 A1 | 6/1988 |
| FR | 2612833 A1 | 9/1988 |

OTHER PUBLICATIONS

Final Office Action, dated Mar. 2, 2012, regarding U.S. Appl. No. 12/332,093, 7 pages.

Notice of Allowance, dated Jun. 19, 2012, regarding U.S. Appl. No. 12/332,093, 13 pages.

Office Action, dated May 6, 2013, regarding U.S. Appl. No. 13/626,064, 24 pages.

Office Action, dated Feb. 24, 2014, regarding U.S. Appl. No. 13/626,064, 12 pages.

Notice of Allowance, dated Apr. 1, 2014, regarding U.S. Appl. No. 13/626,064, 7 pages.

Office Action, dated Feb. 13, 2015, regarding U.S. Appl. No. 14/326,440, 22 pages.

Notice of Allowance, dated Apr. 24, 2015, regarding U.S. Appl. No. 14/326,440, 8 pages.

Office Action, dated Feb. 2, 2011, regarding U.S. Appl. No. 12/332,190, 12 pages.

Final Office Action, dated Aug. 2, 2011, regarding U.S. Appl. No. 12/332,190, 12 pages.

Office Action, dated Jan. 3, 2012, regarding U.S. Appl. No. 12/332,190, 4 pages.

Final Office Action, dated Jun. 8, 2012, regarding U.S. Appl. No. 12/332,190, 11 pages.

Office Action, dated Apr. 10, 2015, regarding U.S. Appl. No. 12/332,190, 25 pages.

Final Office Action, dated Oct. 9, 2013, regarding U.S. Appl. No. 13/626,064, 13 pages.

* cited by examiner

BAGGING PROCESS AND MANDREL FOR FABRICATION OF ELONGATED COMPOSITE STRUCTURE

This application is a divisional of application Ser. No. 12/332,190, filed Dec. 10, 2008.

CROSS-REFERENCE TO RELATED APPLICATIONS

This application is a divisional of application No. 12/332,190, filed Dec. 10, 2008, issued as U.S. Pat. No. 9,296,187 on Mar. 29, 2016. This application is related to co-pending U.S. patent application Ser. No. 12/332,093, filed concurrently herewith on Dec. 10, 2008, and issued as U.S. Pat. No. 8,293,051 B2 on Oct. 23, 2012, which is incorporated by reference herein in its entirety.

TECHNICAL FIELD

The disclosure relates to methods for manufacturing elongated laminated composite structures such as hat stringers or related components, for example and without limitation. More particularly, the disclosure relates to a bagging process and mandrel which utilize an open cell foam carrier for fabrication of an elongated laminated composite structure having constant cross-section such as a vent stringer, for example and without limitation.

BACKGROUND

Hat stringers may be used to stiffen structures such as, without limitation, the skin of wings, fuselage, doors or tail sections. Stringers can be fabricated with various cross-sectional shapes such as, without limitation, a hat cross-section. Stringers used on an aircraft wing may be required to conform to the contour of the wing and may have a length of up to 100 feet or longer.

It may be difficult to manufacture a long, narrow structure, such as a hat stringer, which may be highly-contoured and/or have a cross-section which various along its length. The variations in cross-sectional size and/or shape may have the potential of trapping the structure in any hard mold or mandrel used to maintain the hollow inner shape of the structure during fabrication.

Accordingly, there is a need for a mandrel that may allow it to be more easily removed after a part has been laid-up and/or cured. There is also a need for a method of fabricating composite parts using such a mandrel.

SUMMARY

The disclosure is generally directed to a bagging process and mandrel which utilize an open cell foam carrier for fabrication of an elongated laminated composite structure such as a vent stringer, for example and without limitation. An illustrative embodiment of the mandrel comprises an open cell foam carrier. At least one vacuum bag may enclose the open cell foam carrier. The mandrel may be used to fabricate an elongated laminated composite structure having a constant cross-section such as a vent stringer, for example and without limitation.

The disclosure is further generally directed to a method of fabricating a laminated composite structure. An illustrative embodiment of the method includes providing an open cell foam mandrel. The mandrel may be enclosed in at least one vacuum bag. At least one composite ply may be wrapped on the mandrel. The at least one vacuum bag may enclose the mandrel. The open cell foam carrier may be removed from the at least one composite ply.

The disclosure is further generally directed to a method of fabricating a mandrel suitable for removal from an open end of a composite structure. An illustrative embodiment of the method includes shaping an open cell foam carrier from open cell foam. The open cell foam carrier may be sealed in at least one vacuum chamber. The method may be used to fabricate an elongated laminated composite structure having a constant cross-section such as a vent stringer, for example and without limitation.

The disclosure is further generally directed to an internal shrinkable mandrel for composite stringer fabrication comprising an elongated open cell foam carrier. An elongated inner vacuum bag may enclose the open cell foam carrier. An elongated outer vacuum bag may enclose the inner vacuum bag. An elongated breather ply may enclose the outer vacuum bag. An elongated release ply may enclose the breather ply.

The disclosure is further generally directed to a method of fabricating a laminated composite stringer with a shrinkable internal mandrel comprising providing an elongated mandrel having an open cell foam carrier. An elongated inner vacuum bag may enclose the open cell foam carrier and an elongated outer vacuum bag may enclose the inner vacuum bag. An elongated breather ply may be provided. The outer vacuum bag may be wrapped with the breather ply. An elongated release ply may be provided. The breather ply may be wrapped with the release ply. Laminated composite plies may be provided and wrapped on the release ply. A female mold having a mold cavity may be provided. Outer composite plies may be provided in the mold cavity of the female mold. A structure having a structure channel may be formed from the laminated composite plies by placing the mandrel and the laminated composite plies on the outer composite plies in the mold cavity of the female mold, placing a composite cap over the mold cavity, placing a caul plate on the composite cap and placing a cover bagging film over the caul plate to seal the mandrel and the laminated composite plies in the mold cavity. The open cell foam carrier may be shrunk in the structure channel in the structure by applying vacuum pressure to the open cell foam carrier. The open cell foam carrier may be removed from the structure channel in the structure. The structure may be cured.

The disclosure is further generally directed to a mandrel comprising an open cell foam tube bag carrier. A first vacuum chamber may enclose the foam tube bag carrier. A second vacuum chamber may enclose a composite layup.

BRIEF DESCRIPTION OF THE ILLUSTRATIONS

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure which is defined by the claims. Furthermore, there is no intention to be bound by any expressed or implied theory presented in the preceding technical field, background, brief summary or the following detailed description.

Figure 1:
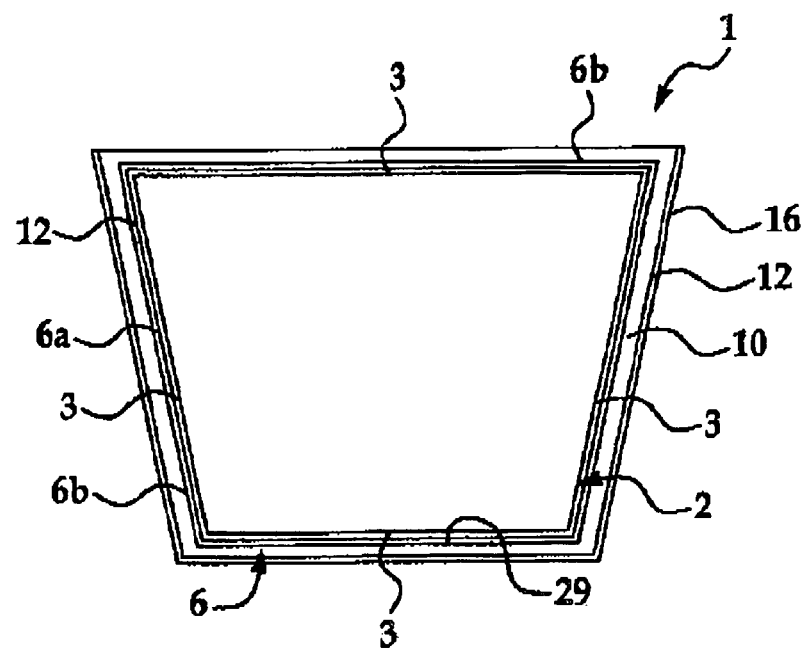
FIG. 1 is a cross-sectional view of a mandrel having an open cell foam carrier and laminated composite plies wrapped around the carrier preparatory to fabrication of a laminated composite structure.

Referring initially to FIG. 1, a mandrel 1 which is suitable for fabrication of an elongated laminated composite structure 17 (FIG. 4) is shown. The mandrel 1 may be particularly suitable for fabrication of an elongated laminated composite structure 17 having a hollow structure channel 18 (FIG. 4) which may have constant cross-sectional size and shape. The mandrel 1 may be particularly suitable for fabrication of elongated laminated composite structures 17, for example and without limitation.

As shown in FIG. 1, the mandrel 1 may include an open cell foam carrier, hereinafter foam tube bag carrier 2, which may be generally elongated. The foam tube bag carrier 2 may be shaped from open cell foam (not shown) into the form of the interior structure channel 18 (FIG. 4) of the laminated composite structure 17 which will ultimately be fabricated using the mandrel 1. The mandrel 1 may have a cross-section which is substantially constant in both size and shape along the entire longitudinal dimension of the foam tube bag carrier 2. The foam tube bag carrier 2 may have multiple carrier surfaces 3 which may correspond positionally to the respective interior surfaces of the laminated composite structure (not shown) which will be fabricated using the mandrel 1, as will be hereinafter described. The foam tube bag carrier 2 may have a cross-section which is smaller than that of the interior structure channel 18 to facilitate removal of the foam tube bag carrier 2 from the interior structure channel 18 prior to curing of the laminated composite structure 17.

Figure 2:
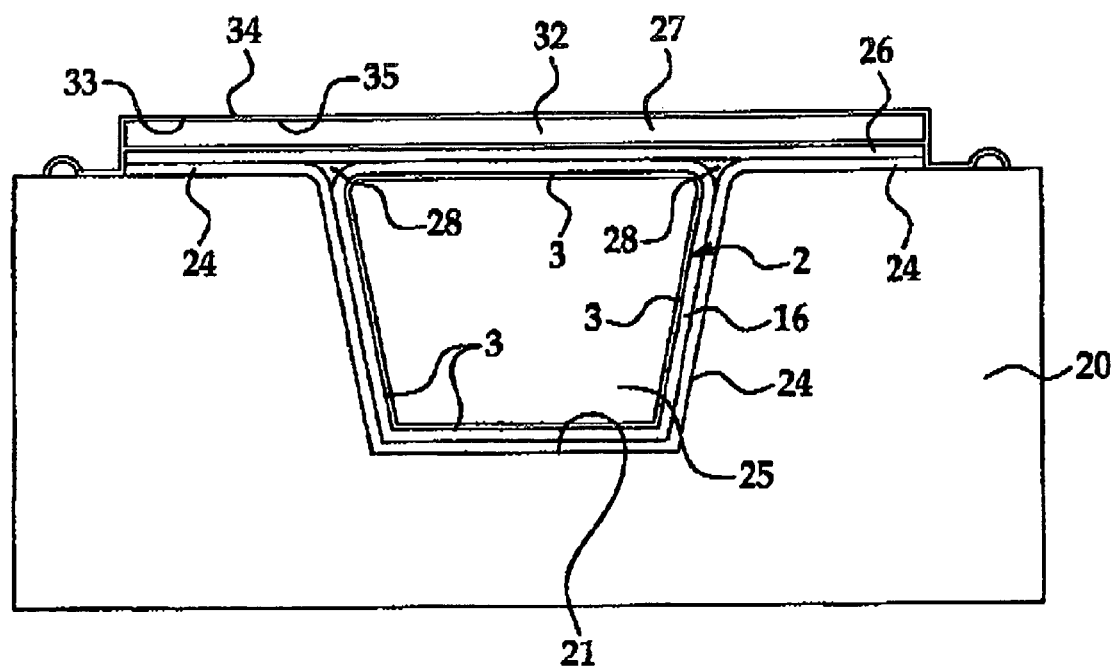
FIG. 2 is a cross-sectional view of the mandrel and wrapped laminated composite plies, seated in a mold cavity of a female mold with a composite cap and a caul plate sealing the mold cavity.

At least one vacuum bag 6a, which may be elongated, may enclose the foam—tube bag carrier 2. The at least one vacuum bag 6a may form a first vacuum chamber 25 (FIG. 2). In some embodiments, the vacuum bag 6a may enclose the foam tube bag carrier 2 and a second vacuum bag 6b may enclose the vacuum bag 6a. At least one breather ply 10 (FIG. 1), which may be elongated, may be wrapped around the vacuum bag 6a or vacuum bags 6a and 6b. At least one release ply 12, which may be elongated, may be wrapped around the breather ply or breather plies 10. Laminated composite plies 16 may be wrapped around the release ply or plies 12. In some embodiments, a breather ply may be provided between the multiple vacuum bags, such as between the vacuum bag 6a and the vacuum bag 6b, for example and without limitation.

Figure 3:
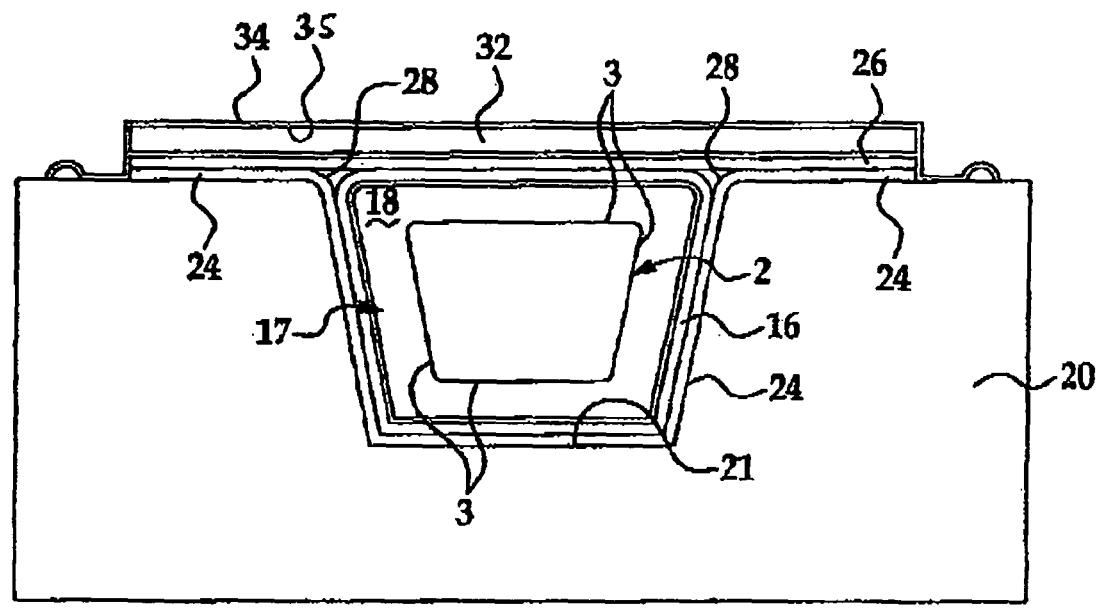
FIG. 3 is a cross-sectional view of the mandrel and wrapped laminated composite plies seated in the mold cavity, after vacuum-induced shrinkage of the open cell foam carrier inside the interior structure cavity of the fabricated laminated composite structure.
Figure 4:
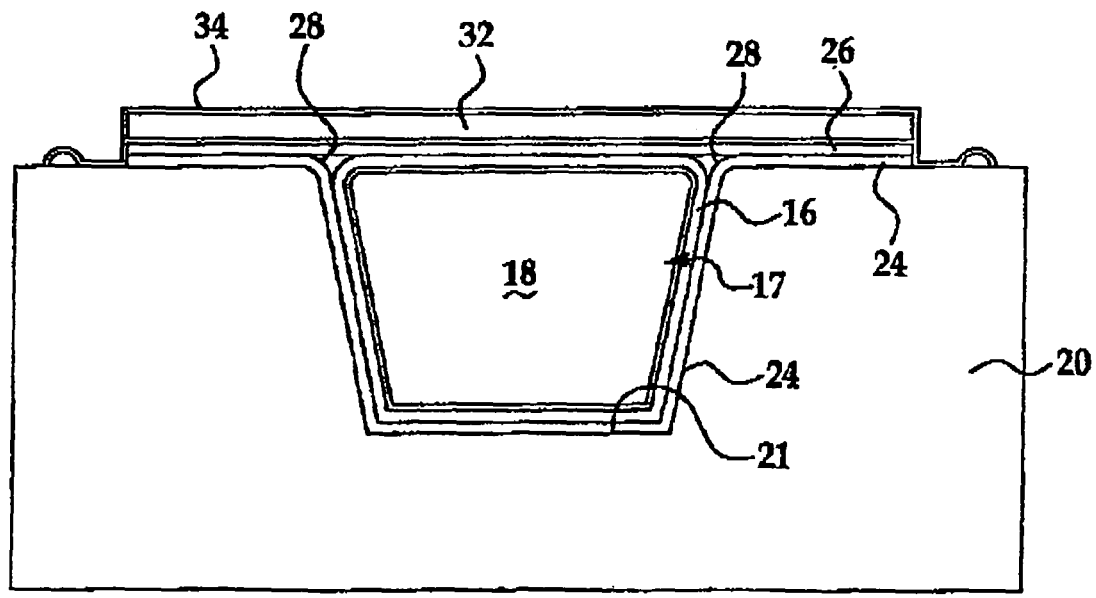
FIG. 4 is a cross-sectional view of the laminated composite structure during curing of the laminated composite, with the open cell foam carrier (not shown) removed from the interior structure cavity of the structure.

Referring next to FIGS. 2-4, sequential fabrication of a laminated composite structure 17 (FIG. 4) using the mandrel 1 is shown. In some applications, the laminated composite structure 17 may be a vent stringer which is suitable for stabilization of an aircraft structure, for example and without limitation. As shown in FIG. 2, the mandrel 1 with the laminated composite plies 16 wrapped around the exterior thereof may be placed in a mold cavity 21 of a female mold 20. The cross-sectional size and shape of the mold cavity 21 may generally correspond to the cross-sectional size and shape of the laminated composite structure 17, which is to be fabricated. It may be necessary that the foam tube bag carrier 2 be molded to the correct inside mold line (IML) of the laminated composite structure 17 which is to be fabricated and that correct firmness of the foam tube bag carrier 2 is selected. Prior to placement of the mandrel 1 into the mold cavity 21, a number of laminated composite plies 16 having different orientation may be wrapped around the foam tube bag carrier 2. Outer composite plies 24 may line and conform substantially to the interior surfaces of the mold cavity 21. The outer plies 24 may extend onto the outer surface of the female mold 20.

A composite cap 26 may be placed over the outer composite plies 24 and the mandrel 1 and wrapped laminated composite plies 16. Radius filler 28 (noodle) may be placed in the openings or gaps between the laminated composite plies 16 and the outer composite plies 24. The radius filler 28 may then be pressed in place. The foam tube bag carrier 2 must be sufficiently firm to support the pressure, which is applied to compress and place the radius filler 28. A caul plate 32 and a cover bagging film or outer vacuum bag 34 may be sealed over the composite cap 26. The outer vacuum bag 34 and the vacuum bag 6b along with mold 20 may form a second vacuum chamber 27. A first breather ply 33 (FIG. 2) may be placed in the second vacuum chamber 27 under the outer vacuum bag 34. A second breather ply 10 (FIG. 1) may be placed in the second vacuum chamber 27 around the vacuum bag 6b. The first breather ply 33 may enclose a release ply 35.

As shown in FIG. 3, vacuum pressure may next be applied to the innermost vacuum bag 6a (FIG. 1) and the foam tube bag carrier 2. The vacuum pressure applied to the innermost vacuum bag 6a and the foam tube bag carrier 2 may cause shrinkage of the foam tube bag carrier 2 and disengagement of the carrier surfaces 3 of the foam tube bag carrier 2 from the respective interior surfaces of the laminated composite structure 17. The foam tube bag carrier 2 may then be removed from the structure channel 18 of the laminated composite structure 17. In some applications, shrinkage of the foam tube bag carrier 2 may be accomplished by application of vacuum pressure to the vacuum bag 6a along with mold 20, followed by removal of the foam tube bag carrier 2. The vacuum bag 6b, in combination with the outer vacuum bag 34, may form the second vacuum chamber 27 with the mold 20 during ply consolidation and/or cure of the hat-stringer layup 16, 24, 26. Finally, as shown in FIG. 4, the laminated composite structure 17 may be cured after release of vacuum pressure. In subsequent steps, the outer vacuum bag 34; the caul plate 32; and the composite cap 26, respectively, may be removed and the laminated composite structure 17 removed from the mold cavity 21 of the female mold 20 for further processing. In some applications, the foam tube bag carrier 2 may be reusable and less complex, reducing costs. The cured part may comprise a duct (not shown) or a conduit (not shown) used to transport fluids, such as, for example and without limitation, air ducts and fuel lines used in a wide variety of applications, including vehicles.

In some applications, the laminated composite structure 17 may have a cross-sectional area and/or shape which varies along the length of the laminated composite structure 17. For example and without limitation, the sides of the laminated composite structure 17 may change from 80 degrees to 90 degrees or the ends may be thicker than the middle of the laminated composite structure 17. In some applications, bends or joggles may be in the laminated composite structure 17. Under those circumstances, the structure of the laminated composite structure 17 would otherwise have a tendency to trap a mandrel (not shown) used in place of the foam tube bag carrier 2 in the event that the mandrel is rigid and non-collapsible. Therefore, extraction of the collapsed foam tube bag carrier 2 from the interior of the laminated composite structure 17 prior to curing may be unhindered irrespective of changes in the cross-sectional area or shape of the laminated composite structure 17 along its length.

Figure 5:
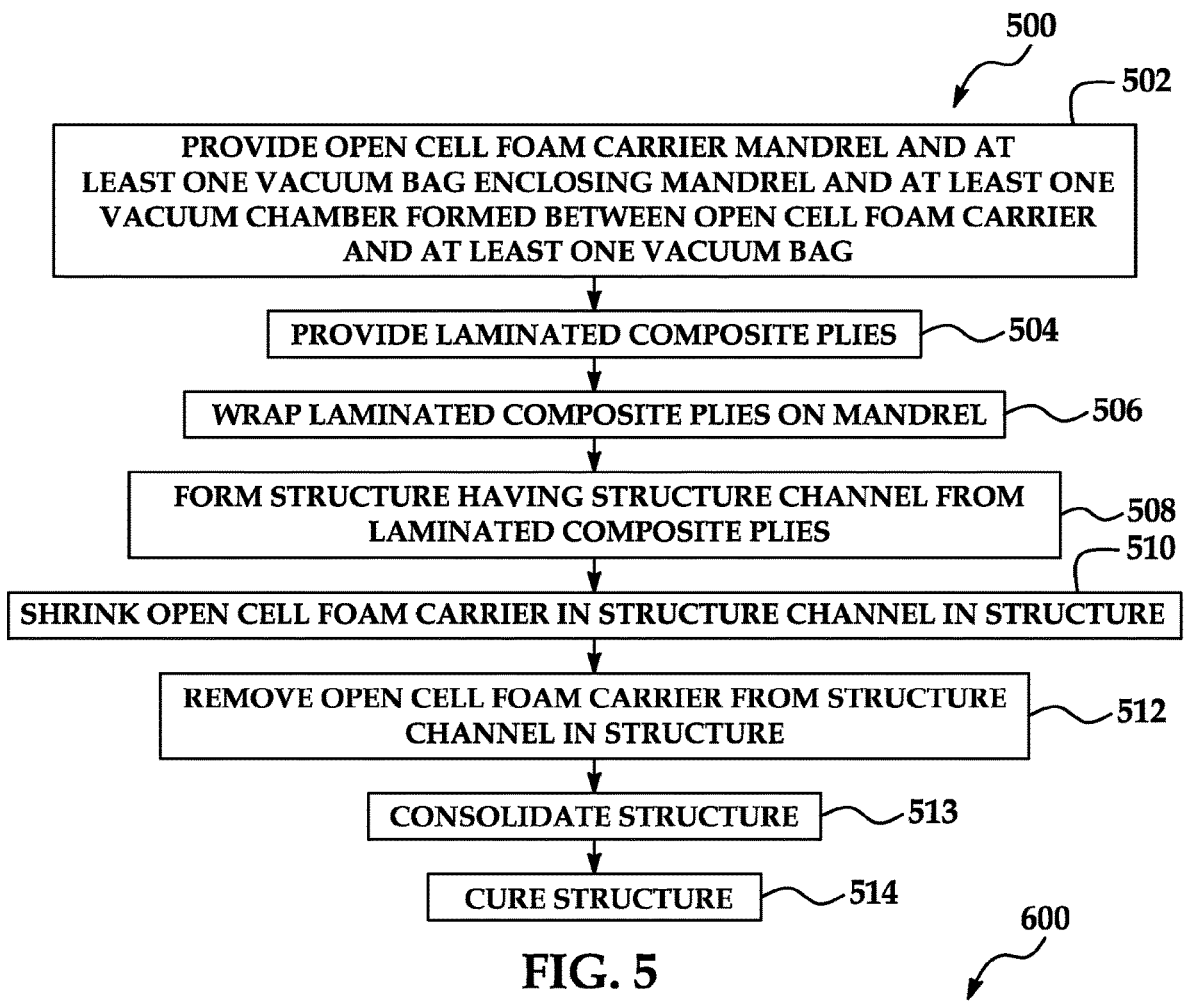
FIG. 5 is a flow diagram which illustrates an illustrative embodiment of a method of fabricating a laminated composite structure.

Referring next to FIG. 5, a flow diagram 500, which illustrates an illustrative embodiment of a method of fabricating a laminated composite structure is shown. In block 502, an open cell foam carrier mandrel and at least one vacuum bag enclosing the open cell foam carrier mandrel may be provided. At least one vacuum chamber may be formed between the open cell foam carrier and the at least one vacuum bag 6a. In some embodiments, an inner vacuum bag and an outer vacuum bag may enclose the open cell foam carrier. A first vacuum chamber 25 may be formed between the open cell foam carrier 2 and the vacuum bag 6a. A second vacuum chamber 27 may be formed between the' vacuum bag 6b and the outer vacuum bag 34. Breather ply 33 may be placed in the second vacuum chamber 27 under the outer vacuum bag 34. Breather ply 10 may be placed in the second vacuum chamber 27 around the vacuum bag 6b. Breather ply 33 may enclose a release ply 35. In block 504, laminated composite plies may be provided. In block 506, the laminated composite plies may be wrapped on the mandrel. In block 508, a structure having a structure channel may be formed from the laminated composite plies. In some embodiments, a female mold having a mold cavity may be provided and the mandrel and the laminated composite plies may be sealed in the mold cavity. A composite cap may be placed over the mold cavity, a caul plate may be placed on the composite cap and a cover bagging film may be placed over the caul plate. In some embodiments, outer composite plies may be provided in the mold cavity of the female mold and the mandrel may be placed on the outer composite plies and then sealed in the mold cavity. In some embodiments, radius filler may be provided between the laminated composite plies and the outer composite plies. In block 510, the open cell foam carrier may be shrunk and/or squeezed in the structure channel in the structure. In some embodiments, the open cell foam carrier may be shrunk in the structure channel by applying vacuum pressure to the open cell foam carrier. Therefore, the vacuum bag 6a may form a vacuum-proof surface which coats the open cell foam carrier, allowing evacuation of air from the open cells of the open cell foam carrier 2. In block 512, the open cell foam carrier may be removed from the structure channel in the structure. In block 513, the structure may be consolidated. In block 514, the structure may be cured.

Figure 6:
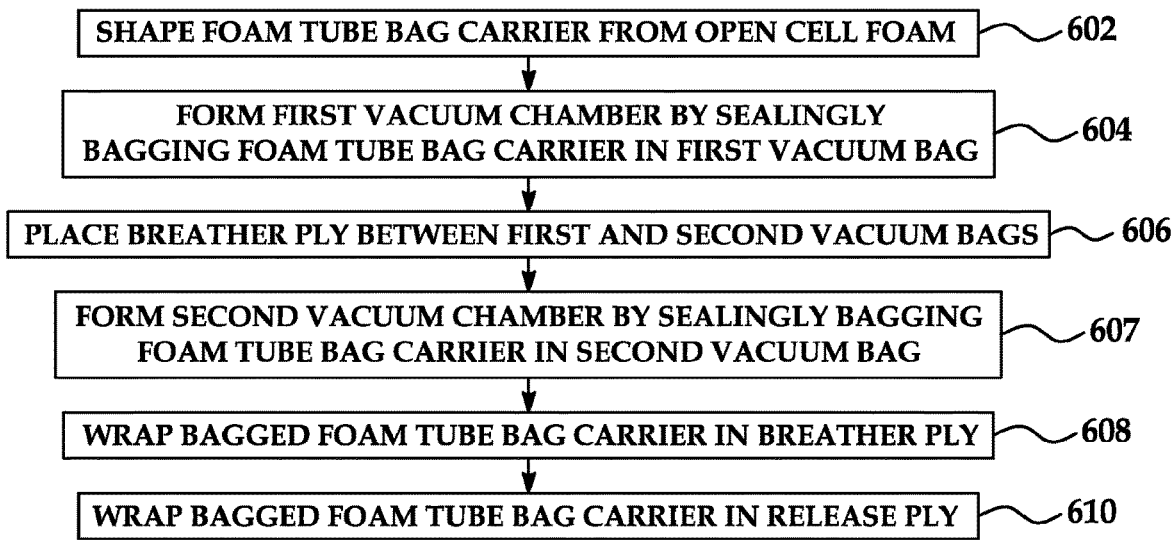
FIG. 6 is a flow diagram which illustrates an illustrative embodiment of a method of fabricating a mandrel suitable for fabrication of a laminated composite structure.
Figure 6A:
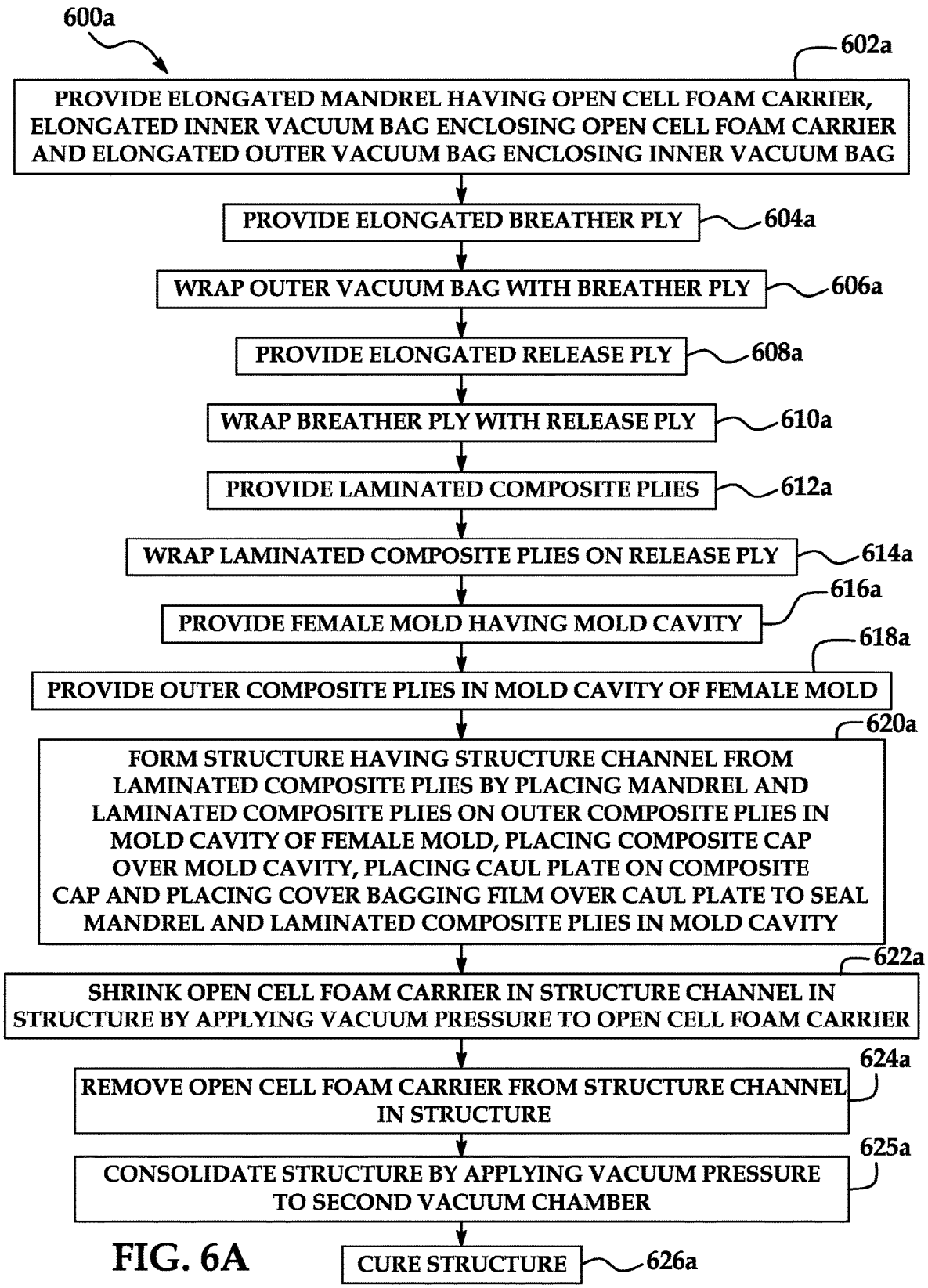
FIG. 6A is a flow diagram which illustrates an alternative illustrative embodiment of a method of fabricating a mandrel suitable for fabrication of a laminated composite structure.

Referring next to FIG. 6, a flow diagram 600, which illustrates an illustrative embodiment of a method of fabricating a mandrel suitable for removal from an open end of a composite structure is shown. In block 602, a foam tube bag carrier is shaped from open cell foam. In block 604, a first vacuum chamber is formed by sealingly bagging the foam tube bag carrier in a first vacuum bag 6a. In block 606, a breather ply may be placed between the first and second vacuum bags. In block 607, a second vacuum chamber is formed by sealingly bagging outer vacuum bag 34 to mold 20 and the (vacuum bag 6A) bagged foam tube bag carrier in a vacuum bag 6b. In block 608, vacuum bag 6b is wrapped in a breather ply. In block 610, vacuum bag 6b, wrapped in a breather ply, is then wrapped in a release ply.

Referring next to FIG. 600A, a flow diagram 600A which illustrates an alternative illustrative embodiment of a method of fabricating a mandrel suitable for fabrication of a laminated composite structure is shown. In block 602a, an elongated mandrel having an open cell foam carrier, an elongated inner vacuum bag enclosing the open cell foam carrier and an elongated outer vacuum bag enclosing the inner vacuum bag is provided. A first vacuum chamber may be formed around and including the open cell foam carrier inside the vacuum bag 6a. A second vacuum chamber may be formed between the vacuum bag 6a and the vacuum bag 6b. A breather ply may be placed between the vacuum bag 6a and the vacuum bag 6b. In block 604a, an elongated breather ply is provided. In block 606a, the vacuum bag 6b is wrapped with the breather ply. In block 608a, an elongated release ply is provided. In block 610a, the breather ply is wrapped with the release ply. In block 612a, laminated composite plies are provided. In block 614a, the laminated composite plies are wrapped on the release ply. In block 616a, a female mold having a mold cavity is provided. In block 618a, outer composite plies are provided in the mold cavity of the female mold. In block 620a, a structure having a structure channel is formed from laminated composite plies by placing the mandrel and laminated composite plies on outer composite plies in the mold cavity of the female mold, placing a composite cap over the mold cavity, placing a caul plate on the composite cap and placing cover bagging film over the caul plate to seal the mandrel and the laminated composite plies in the mold cavity. In block 622a, the open cell foam carrier is shrunk in the structure channel in the structure by applying vacuum pressure to the open cell foam carrier. In block 624a, the open cell foam carrier is removed from the structure channel in the structure. In block 625a, the structure may be consolidated by applying vacuum pressure to the second vacuum chamber. In block 626a, the structure is cured.

Figure 6B:
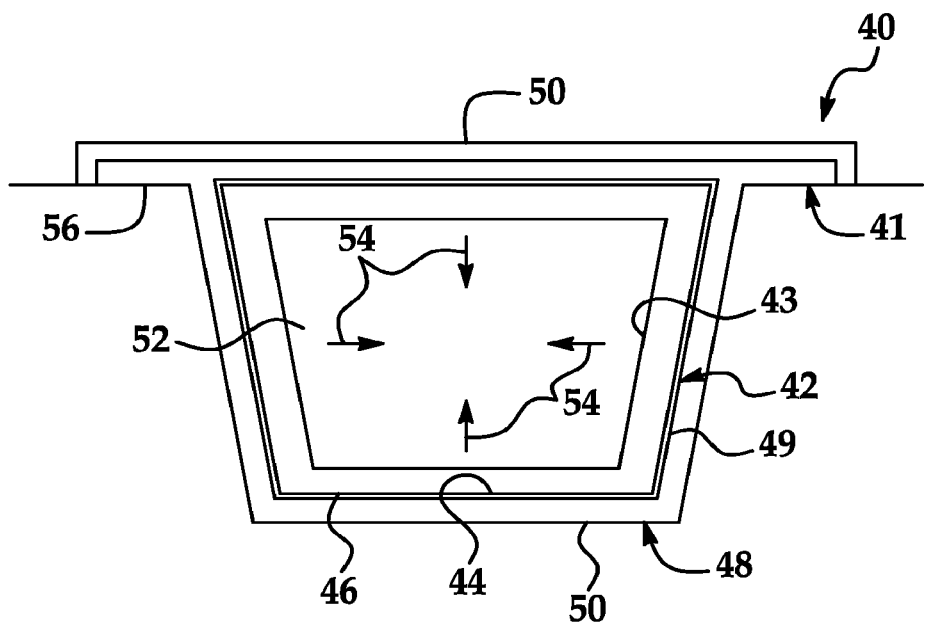
FIG. 6B is a cross-sectional view of a mandrel having a foam tube bag carrier and first and second vacuum chambers formed around the foam tube bag carrier.

Referring next to FIG. 6B, an illustrative embodiment of a mandrel 40 is shown. The mandrel 40 may include an inner or first vacuum chamber 42 which is placed in a female mold 41. The first vacuum chamber 42 may have an outer surface 44. An open cell foam tube bag carrier 52 may be placed in the first vacuum chamber 42. The first vacuum chamber 42 may be provided in an outer or second vacuum chamber 48. The second vacuum chamber 48 may have an inner surface 49 and an outer surface 50 and may enclose a composite layup 56. In some embodiments, a breather ply 46 may be placed between the outer surface 44 of the first vacuum chamber 42 and the inner surface 49 of the second vacuum chamber 48. In application, vacuum pressure 54 may be applied to the foam tube bag carrier 52 to shrink the foam tube bag carrier 52 in the first vacuum chamber 42 and the second vacuum chamber 48 and facilitate removal of the foam tube bag carrier 52.

Figure 6C:
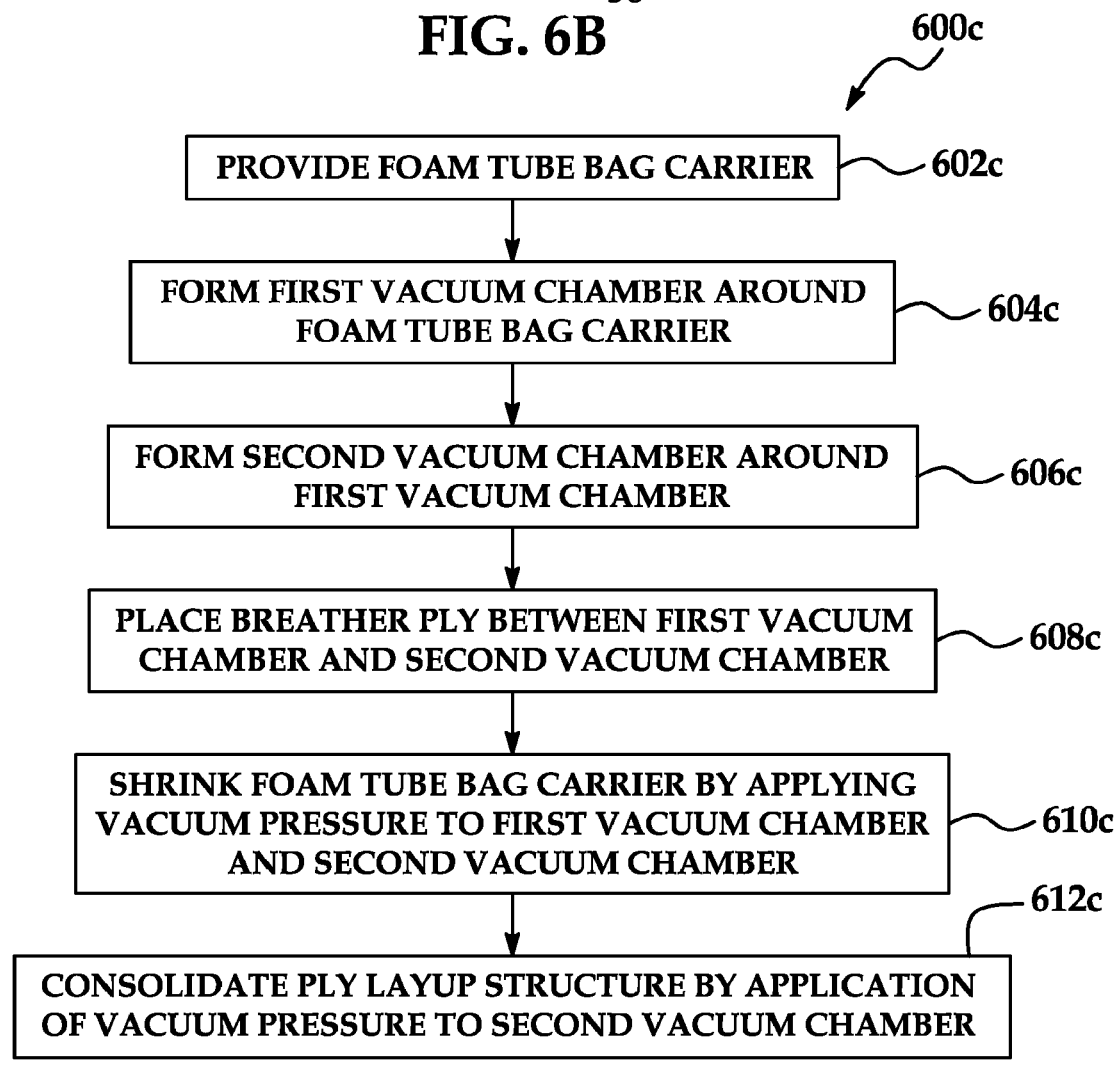
FIG. 6C is a flow diagram which illustrates an illustrative embodiment of a method of forming first and second vacuum chambers around a foam tube bag carrier.

Referring next to FIG. 6C, a flow diagram 600C which illustrates an illustrative embodiment of a method of forming first and second vacuum chambers around a foam tube bag carrier is shown. In block 602c, a foam tube bag carrier is provided. In block 604c, a first vacuum chamber is formed around the foam tube bag carrier. In block 606c, a second vacuum chamber is formed with the mold 41, 49 and 50. In block 608c, a breather ply may be placed between the first vacuum chamber and the second vacuum chamber. In block 610c, the foam tube bag carrier may be shrunk by applying vacuum pressure to the first vacuum chamber. In block 612c, a structure formed composite plies 16, 24 and 26 may be consolidated by application of vacuum pressure to the second vacuum chamber.

Figure 7:
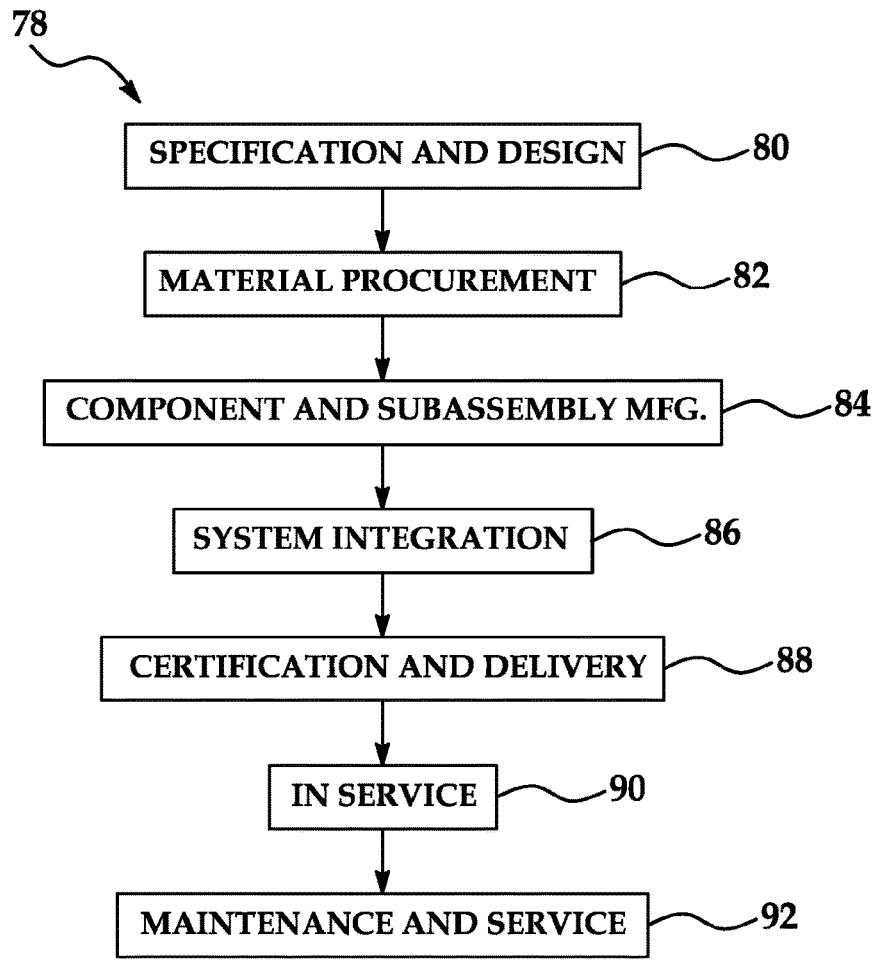
FIG. 7 is a flow diagram of an aircraft production and service methodology.
Figure 8:
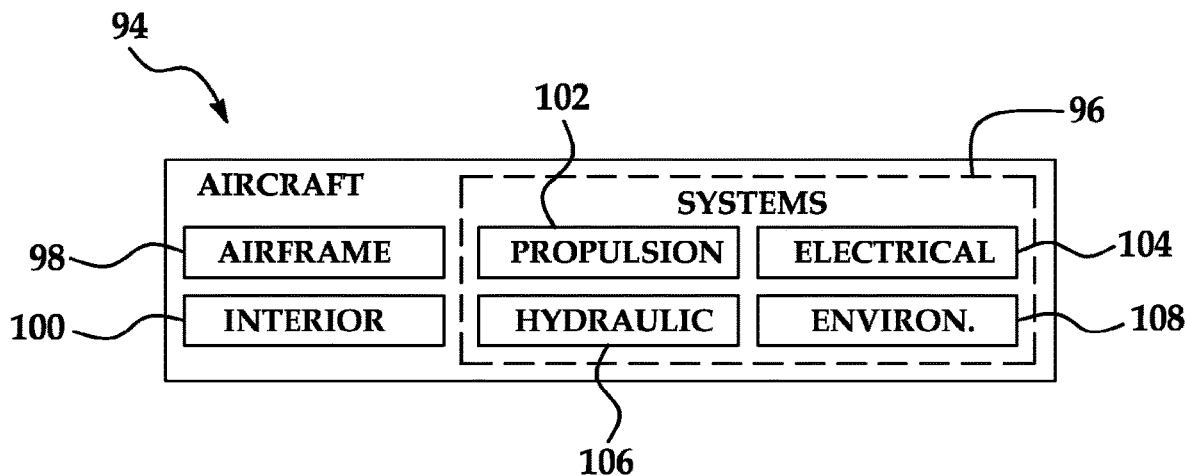
FIG. 8 is a block diagram of an aircraft.

Referring next to FIGS. 7 and 8, embodiments of the disclosure may be used in the context of an aircraft manufacturing and service method 78 as shown in FIG. 7 and an aircraft 94 as shown in FIG. 8. During pre-production, exemplary method 78 may include specification and design 80 of the aircraft 94 and material procurement 82. During production, component and subassembly manufacturing 84 and system integration 86 of the aircraft 94 takes place. Thereafter, the aircraft 94 may go through certification and delivery 88 in order to be placed in service 90. While in service by a customer, the aircraft 94 may be scheduled for routine maintenance and service 92 (which may also include modification, reconfiguration, refurbishment, and so on).

Each of the processes of method 78 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 8, the aircraft 94 produced by exemplary method 78 may include an airframe 98 with a plurality of systems 96 and an interior 100. Examples of high-level systems 96 include one or more of a propulsion system 102, an electrical system 104, a hydraulic system 106, and an environmental system 108. Any number of other systems may be included. Although an aerospace example is shown, the principles of the concept may be applied to other industries, such as the automotive industry.

The apparatus embodied herein may be employed during any one or more of the stages of the production and service method 78. For example, components or subassemblies corresponding to production process 84 may be fabricated or manufactured in a manner similar to components or subassemblies produced while the aircraft 94 is in service. Also, one or more apparatus embodiments may be utilized during the production stages 84 and 86, for example, by substantially expediting assembly of or reducing the cost of an aircraft 94. Similarly, one or more apparatus embodiments may be utilized while the aircraft 94 is in service, for example and without limitation, to maintenance and service 92.

Although the embodiments of this disclosure have been described with respect to certain exemplary embodiments, it is to be understood that the specific embodiments are for purposes of illustration and not limitation, as other variations will occur to those of skill in the art.

What is claimed is:

1. An apparatus, configured for fabrication of laminate plies into a structure, such that the apparatus comprises:
   a mandrel;
   a female mold that comprises:
      a support to a first laminate ply; and
      a cavity recessed within a surface of the female mold and configured to receive the mandrel, such that the mandrel comprises a single continuous elongated collapsible open cell foam carrier that comprises:
         a size that contacts and compresses the first laminate ply against walls of the cavity; and
         a firmness sufficient to support a pressure applied by a placement of a radius filler against the mandrel; and
      a support to a second laminate ply that encloses the mandrel within the cavity;
   a first vacuum bag configured to form a first vacuum chamber configured to enclose said single continuous elongated collapsible open cell foam carrier;
   a breather ply that encloses the first vacuum bag;
   located within the cavity, a second vacuum bag that encloses the breather ply and the first vacuum bag; and
   an outer vacuum bag, attached to the female mold, such that the outer vacuum bag:
      encloses the cavity; and
      forms a second vacuum chamber between the outer vacuum bag and the second vacuum bag.

2. The apparatus of claim 1, further comprising:
   The apparatus of claim 1, further comprising the mandrel comprising a cross-section that varies along a length of the mandrel.

3. The apparatus of claim 1 further comprising a release ply configured to enclose said breather ply.

4. The apparatus of claim 3, further comprising:
   the outer vacuum bag configured to cover a caul plate that covers an opening of the cavity that receives the mandrel; and
   a second breather ply between the outer vacuum bag and the second vacuum bag.

5. The apparatus of claim 4 further comprising a second release ply between said second breather ply between said outer vacuum bag and the second vacuum bag.

6. The apparatus of claim 5 further comprising said release ply being within and displaced from direct contact with the cavity that conforms to a cross-section of the mandrel.

7. A machine configured for composite stringer fabrication, such that the machine comprises:
   a single shrinkable male mandrel;
   a female mold that comprises a cavity recessed within a surface of the female mold and configured to receive the single shrinkable male mandrel that comprises:
      a size that contacts and compresses the composite stringer against walls of the cavity; and
      a single elongated open cell foam carrier that supports itself and comprises a firmness sufficient to support a pressure applied by a placement of a radius filler against the single shrinkable male mandrel;

an elongated first vacuum bag that:
  encloses the single elongated open cell foam carrier; and
  forms a first vacuum chamber;

an elongated second vacuum bag that encloses the elongated first vacuum bag;

an elongated breather ply that encloses said elongated second vacuum bag;

an elongated release ply that encloses said elongated breather ply; and an outer vacuum bag that:
  encloses a caul plate that encloses the cavity; and
  forms a second vacuum chamber between the outer vacuum bag the elongated second vacuum bag.

8. An apparatus that comprises:

a male mandrel;

a female mold that comprises a cavity recessed within a surface of the female mold and configured to hold the that holds a male mandrel that comprises a single continuous elongated structurally shrinkable open cell foam tube bag carrier that comprises:
  a size that contacts and compresses a laminate ply against walls of the cavity; and
  a firmness sufficient to support a pressure applied by a placement of a radius filler against the male mandrel;

a first vacuum chamber formed by a first vacuum bag that encloses the single continuous elongated structurally shrinkable open cell foam tube bag carrier;

an elongated breather ply that covers the first vacuum bag; and a second vacuum chamber formed between a second vacuum bag and an outer vacuum bag that covers a caul plate that covers the cavity as the cavity holds the first vacuum bag within the second vacuum bag.

9. The apparatus of claim 8, such that the apparatus further comprises an elongated release ply configured to enclose the elongated breather ply.

10. The apparatus of claim 8, such that the single continuous elongated structurally shrinkable open cell foam tube bag carrier comprises a reusable structure.

11. The apparatus of claim 1, such that the single continuous elongated open cell foam carrier comprises a reusable structure.

12. The machine of claim 7, such that the single continuous elongated open cell foam carrier comprises a reusable structure.

13. The machine of claim 7, further comprising a cross-section that varies along a length of the single shrinkable male mandrel.

14. The machine of claim 7, further comprising the single elongated open cell foam carrier comprising a reusable structure.

15. The machine of claim 7, further comprising a second breather ply between the outer vacuum bag and the cavity.

16. The machine of claim 15, further comprising a second release ply between the second breather ply and the cavity.

17. The apparatus of claim 8, further comprising the male mandrel comprising a cross-section that varies along a length of the male mandrel.

18. The apparatus of claim 8, further comprising the single continuous elongated structurally shrinkable open cell foam tube bag carrier being a reusable structure.

* * * * *